United States Patent Office 3,629,176
Patented Dec. 21, 1971

3,629,176
NON-RESINOUS COMPOSITIONS CONTAINING A UREA-FORMALDEHYDE REACTION PRODUCT AND MELAMINE
Donald S. Shriver, Hopewell, Va., assignor to Allied Chemical Corporation, New York, N.Y.
No Drawing. Continuation-in-part of application Ser. No. 101,071, Apr. 6, 1961. This application Aug. 10, 1964, Ser. No. 388,692
Int. Cl. C08g 9/24, 37/30
U.S. Cl. 260—29.4         3 Claims

ABSTRACT OF THE DISCLOSURE

A stable slurry comprising a substantially unreacted mixture of (1) a preformed non-resinous urea-formaldehyde reaction product reacted to the polymethyl urea stage, having a mol ratio of from 4.0 to 7.3 mols of formaldehyde per mol of urea and a pH of at least 7.0 is mixed with melamine or urea and melamine in an amount sufficient to reduce the formaldehyde to $NH_2$ group ratio to 0.7 to 1.0 mol of formaldehyde for every mol of $NH_2$ group present. The amount of melamine present in the mixture is at least 0.5% by weight of the total urea plus formaldehyde present.

---

This invention relates to the bonding of materials by adhesives and, more particularly, to a process of bonding materials together with the use as adhesives of certain non-resinous compositions containing mixtures of a urea-formaldehyde reaction product and melamine. This application is a continuation-in-part of my copending application, Ser. No. 101,071, filed Apr. 6, 1961, now abandoned.

Urea-foramldehyde resin compositions, useful as adhesives in the bonding together of various materials, such as wood panels to form plywood, wood chips to form chipboard, sand particles to form sand cores, and the like, have been well-known in the art for some time. Earlier examples of such urea-formaldehyde resin compositions are disclosed in U.S. Pats. 2,193,630, 2,245,491, and 2,320,301, and more recent examples are disclosed in U.S. Pats. 2,554,424, 2,559,578, and 2,772,197. In all cases, as exemplified by these prior art patents, the compositions are already resinous when used. That is, when preparing an adhesive material comprising a urea-formaldehyde condensate and/or urea, it has always been considered necessary to cook and/or reflux the materials, or evaporate water therefrom by other means, to thereby react the raw materials to the resinous stage. This same technique of reacting the amine and formaldehyde materials to the resinous stage as a necessary step in preparing adhesives has been an accepted precept whether the final adhesive comprises a mixture of a urea-formaldehyde resin and a melamine-formaldehyde resin as exemplified in U.S. Pat. 2,772,197, or a resinous reaction product of a urea-formaldehyde resin and melamine as exemplified in U.S. Pat. 2,898,324. All such resin formation in the preparation of adhesives based on amine-formaldehyde condensates require the use of specialized equipment and processing techniques, and the time for such processing.

Adhesives now in use by manufacturers of bonded materials, such as plywood, chipboard and sand cores, are usually purchased from an adhesive-resin producer who has the necessary equipment and know-how for such processing. The ultimate user of the adhesives is presently dependent upon such resin producers and must pay a higher cost than would otherwise be the case if resin formation were not necessary, and the equipment therefor and the processing time for use of the latter could thus be eliminated. Moreover, it is well-known that urea-formaldehyde adhesive resins are unstable and have an inherent tendency to harden prematurely, particularly when a hardener catalyst (such as ammonium chloride, ammonium sulphate, ammonium phosphate, lactic acid, acetic acid, etc.) is added, as is conventional. Thus the time of application of present commercial urea-formaldehyde resin adhesives to the materials to be bonded is fairly critical, since these adhesives may set up, before or after application, prior to the time that bonding is desired. Moreover, the water-resistance of bonds formed by said adhesives when cured leaves something to be desired.

In consideration of the foregoing and of the disadvantages of the prior art bonding processes employing urea-formaldehyde adhesive resins, it is a primary object of the present invention to provide stable adhesive slurries that comprise non-resinous urea-formaldehyde condensates and melamine and in certain instances, urea as well.

It is another object of the invention to provide such stable adhesive slurries into which may be readily incorporated conventional hardener catalysts and/or extenders without adversely affecting the stability of the adhesives, and which may be readily mixed and applied by the ultimate user in a bonding operation.

It is another object of the invention to provide a bonding process wherein a composition containing a non-resinous urea-formaldehyde condensate and melamine in unreacted state is utilized that is resinified in situ to thereby eliminate the resin formation step formerly believed necessary in urea-formaldehyde resin adhesive manufacture.

It is yet another object of the invention to provide a process for bonding materials that permits non-critical lay-up time after application of the catalyzed and extended adhesive to the materials to be bonded.

Another object of the invention is to provide processes that are particularly useful in the bonding of respectively, plywood veneers together to form plywood, woodchips to form chipboard, and sand particles to form sand cores or molds, and result in desirably strong bonds. A further object is to provide such products that are particularly water resistant.

The foregoing and other objects and advantages inherent in the invention are obtained by use, in adhesive mixtures, of compositions that comprise: (1) an aqueous non-resinous urea-formaldehyde reaction product having 60% to 90% total solids, a mol ratio of 4.0 to 7.3 mols of formaldehyde per mol of urea and a pH of at least 7.0 and (2) an amount of a substance of the group consisting of melamine and mixtures of melamine and urea, so that the total mol ratio of formealdehyde in the composition for every —$NH_2$ group furnished by the total amount of urea and melamine present in the composition is in the range of from 0.7 to 1.0.

For purposes of this invention, the urea in the liquid non-resinous urea-formaldehyde reaction product and any urea added in the compositions is considered equivalent to 2 mols of —$NH_2$ group per mol of urea; the melamine included is considered equivalent to 3 mols of —$NH_2$ group per mol of melamine. In accordance with the invention, the compositions, prior to use, are kept at a temperature below 100° F., whereby substantially no reaction of said urea-formaldehyde reaction product and said melamine (and any additional free urea if present) occurs. The resulting compositions are then applied as substantially unreacted mixtures of (1) and (2), above, to the surfaces of the materials to be bonded; and thereafter, said mixtures are cured in situ, while said mixture-coated materials are in juxtaposition, to cause bonding of said materials together.

Modes of production of liquid non-resinous urea-formaldehyde reaction products per se meeting the specifications therefor set forth above, and suitable for carrying out the bonding processes of the present invention, are described in detail and claimed in U.S. Pat. No. 2,652,377. An exemplary mode of production of these products is given below:

LIQUID NON-RESINOUS UREA-FORMALDEHYDE REACTION PRODUCT

To a 37% aqueous formaldehyde solution containing less than 1.5% methanol, sufficient 1 N caustic soda solution is added to increase the pH of the formaldehyde solution to 8.6–8.7. The alkaline aqueous formaldehyde solution is warmed to 30° C. and sufficient crystalline urea, to give a formaldehyde to urea mol ratio of 4.9:1 in the reaction mixture, is added with stirring to dissolve the urea in the solution. The reaction mixture, having a pH of about 8.9–9.0, is heated at 50° to 55° C., for 1 to 2 hours and evaporated under 50 mm. of Hg pressure in a tubular film evaporator, through which the liquid passes over the heat transfer surfaces in about 10 seconds to evaporate and take off, as overhead distillate vapors, about 47% by weight of the charge to the evaporator. Under these conditions, the temperature of the reaction mixture being evaporated is about 50°–55° C.

The product drawn from the film-evaporator is a clear, aqueous solution of urea-formaldehyde reaction product, containing about 80–85% by weight total solids and 4.7–4.8 to 1 mol ratio of formaldehyde to urea. The product is not a resin, but contains urea and formaldehyde reacted only to the polymethylolurea stage and is stable for storage periods of at least two months at room temperature. A product of this type is obtainable commercially as UF Concentrate 85 that is manufactured and sold by Allied Chemical Corporation.

The liquid non-resinous urea-formaldehyde reaction product (such as that produced as above) that is to be used for preparing an adhesive mixture in accordance with the present invention, is mixed with melamine (or urea and melamine) in amount sufficient to reduce the formaldehyde to —$NH_2$ group ratio to 0.7 to 1.0 mol of formaldehyde for every mol of —$NH_2$ group present. The proportion of melamine added is largely dependent on the use to which the resulting adhesive is to be put. It has been found that the addition of as little as 0.7% melamine by weight of the total urea and formaldehyde greatly increases the bonding strength of the final product in comparison with similar adhesives containing no melamine. However, the addition of larger percentages of melamine does not bring about a corresponding further increase in bonding strength. Accordingly, where increased bonding strength is the only improvement desired, amounts of melamine ranging from about 0.5% to about 5% by weight of total urea plus formaldehyde are sufficient. Another desirable property of adhesives is water resistance, and this can be attained, in addition to the improved strength already mentioned, by the addition of sufficient melamine to give a final urea:melamine mol ratio in the range 6.5:1 to 0.8:1, that is a final melamine content of about 10% to about 85% by weight of total urea plus formaldehyde present. However, if economy dictates for some purposes, a minor amount of wax composition may be used, instead of the larger percentages of melamine, to impart reasonably good water resistance without seriously impairing bond strength. The added melamine, which may be in a crude state accompanied by impurities such as ammelide and ammeline, is preferably finely ground to facilitate uniform distribution of the melamine in the mixture. The mixing is accomplished at a temperature below that at which substantial reaction of the urea-formaldehyde reaction product with the melamine (and urea if also added) occurs, i.e., at temperatures no higher than 100° F. Sufficient water may then be added to impart to the mixture a consistency suitable for subsequent application to the materials to be bonded together, as is conventional in adhesive preparation. Extenders, such as wheat flour, shell flour, wood flour, alpha cellulose and the like, may be added if desired; as is also conventional in the art. A hardener catalyst may be included in the mixture in amounts equivalent to about 1–10 weight percent of the urea-formaldehyde, melamine (and urea) present in the batch.

The final mixture may be spread on the materials to be bonded together, and, as a primary feature of the present invention, is thereafter resinified or cured in situ, preferably with the aid of heat and/or pressure in certain applications, as will appear hereinafter. In the exercise of the novel processes of the present invention, it is important that the adhesive mixture not be cooked prior to application to the materials to be bonded together. Besides the savings which result from omitting the customary resin formation step, as already referred to herein; it has been found that the uncooked, but catalyzed, adhesive is unusually stable when placed on the materials that are to be bonded together. For example, materials coated with the adhesive mixtures in accordance with the invention may be allowed to stand for long periods, up to 40 hours or longer, without danger of precure of the adhesive.

The invention will be further illustrated by the examples which follow, in which all parts are given by weight unless stated otherwise. While the examples are embodiments of the invention, it will be understood that they are not to be construed as limitations thereon.

Example 1

A slurry was prepared by mixing, at room temperature, 100 parts of a non-resinous urea-formaldehyde condensate, prepared by the process referred to previously under the heading "Liquid Non-Resinous Urea-Formaldehyde Reaction Product," and 65.8 parts of finely ground melamine. The resulting slurry contained 78% urea-formaldehyde-melamine solids (as determined by evaporation of a weighed sample to dryness at 220° F.) and had a mol ratio of 0.8 to 1 formaldehyde to —$NH_2$ group and an 0.8 to 1 urea to melamine mol ratio. There were then incorporated in the slurry 2.5 parts hexamethylenetetramine as buffer and 3.25 parts ammonium chloride as catalyst, and thereafter, 23 parts of wheat flour and 3 parts shell flour were admixed as extenders. To the resulting mixture there were then added 50 parts of water to obtain a consistency desired for this adhesive mixture.

The finished adhesive product was then spread on both faces of 60 pieces of plywood core stock having dimensions of 8" by 8" by 1/16", at a rate of 18 grams per square foot of surface. Thereafter, 1/16" face and back veneers were placed on each core and the lay-ups were allowed to stand for periods of 5 minutes to 24 hours. The plywood assemblies were then cured at 200 p.s.i. pressure and 302° F. platen temperatures for periods ranging from 5 to 15 minutes. All the panels formed showed a very high proportion of wood failure when tested in accordance with Commercial Standards CS45–55 and ASTM D805–52. The panels also had excellent shear strength and waterproof properties.

Example 2

An adhesive slurry was prepared similar to the adhesive of Example 1, except that in the initial mixing operation, 24 parts urea and 34.9 parts melamine were added to 100 parts of the non-resinous urea-formaldehyde condensate used in the prior example. The urea-formaldehyde-melamine slurry contained 76% solids and had an 0.8 to 1 formaldehyde to —$NH_2$ group mol ratio and a 3:1 urea to melamine mol ratio. All the panels formed showed high wood failure, shear strength and waterproof properties about equal to those formed by the adhesive of Example 1, where only melamine was added.

Example 3

An adhesive slurry was prepared similar to the adhesives of Examples 1 and 2, except that 38 parts of urea and 25 parts of melamine were added to 100 parts of the non-resinous urea-formaldehyde condensate used in Example 1. The final adhesive slurry had a 0.74 to 1 formaldehyde to —$NH_2$ mol ratio and a 5.2 to 1 urea to melamine mol ratio.

To prepare chipboard, 54 parts of the above adhesive slurry were sprayed on 570 parts of pine chips having a moisture content of 5%. Then 13 parts of 45% wax emulsion were sprayed on the chips to improve water resistance. The treated chips were piled onto a mat and pressed at 302° F. for 12.5 minutes. Maximum pressure was 350 p.s.i.g. A good quality chipboard was produced.

Example 4

A solution was prepared by mixing, at room temperature, 100 parts of a non-resinous urea-formaldehyde condensate, prepared by the process referred to previously under the heading "Liquid Non-Resinous Urea-Formaldehyde Reaction Product," and 24 parts of urea. To this solution was added 35 parts of finely divided melamine. The urea-formaldehyde-melamine slurry contained about 76% solids and had an 0.8 to 1 formaldehyde to —$NH_2$ group mol ratio and a 3:1 urea to melamine mol ratio. Solids content is determined by drying a weighed portion of the unfilled (no walnut shell flour) adhesive mixture in a forced draft oven at about 220° F. for a period of three hours. The non-volatile residue is weighed as solids content. The mixture was stirred and 1 part of ammonium chloride in 15 parts of water was added. Walnut shell flour, 40 parts in 15 parts of water, was then added to the mix. Stroke cure of the adhesive was 10 seconds at 266° F.; viscosity was 1000 centipoises (Brookfield spindle No. 3 at 60 r.p.m.); pot life, 24 hours. Stroke cure time is a measure of the period of cure required of a small amount of adhesive spread with a spatula on a hot surface at the temperature indicated, 266° F. Cure is judged complete when the adhesive turns solid. This is sensed by a continuous stroking motion of the spatula. The adhesive product was spread on both faces of 100 pieces of Douglas fir plywood core stock having dimensions of 12" x 12" x ⅛", at a rate of 18 parts per core equivalent to 20 lbs./M ft.² single glue line. Thereafter, ⅛" Douglas fir face and back veneers were placed on each core and the lay-ups were allowed to stand ¼ to 3 hours. The plywood assemblies were then cured at 200 p.s.i. pressure, 300° F. platen temperature for periods ranging from 1 to 15 minutes. All panels formed showed a high proportion of wood failure when tested in accordance with Commercial Standards CS45–55 and ASTM D805–52.

Example 5

A sand molding formulation was prepared as follows: a bonding material was first prepared by mixing 100 parts by weight of a non-resinous urea-formaldehyde condensate prepared by the process referred to previously under the heading "Liquid Non-Resinous Urea-Formaldehyde Reaction Product," with 25 parts urea, 35 parts melamine and 1 part ammonium chloride dissolved in 30 parts of water. This formulation yields about 70% dry resin solids at 220° F. To 100 parts of Wisconsin foundry sand were added 10 parts of the urea-formaldehyde bonding formulation and the sand and solutions were thoroughly mixed. Moldings were made by curing the resin-sand composition 20 minutes at 212° F. The compressive strength of these moldings was 250 p.s.i.g.

Example 6

An adhesive slurry was prepared by mixing at room temperature 2000 parts of UF Concentrate 85, a non-resinous urea-formaldehyde condensate, 986 parts of uncoated pelleted urea, 20 parts of crystal melamine, 240 parts of water and 25 parts of ammonium sulfate. The resulting slurry had an 0.8 to 1 formaldehyde to —$NH_2$ mol ratio and a 156 to 1 urea to melamine mol ratio and a melamine content of about 0.74% by weight of urea and formaldehyde. After standing one-half hour at 25° C., the slurry had a viscosity of 58 cps., a pH of 5.3 and contained 66% resin solids (Plastic Materials Manufacturing Association test).

To prepare a particleboard, 110 parts of water was sprayed onto 3710 parts of a pine-mixed hardwoods furnish at 7% moisture content. Then 428 parts of the above adhesive slurry was sprayed onto the furnish in 2.5 minutes to give an 8% resin solids application. The sprayed furnish had a moisture content of 11.2%. A mat containing 1250 parts of sprayed furnish was laid in a 12" x 15" forming box. The mat was transferred to an electrically heated platen press. Platen temperature was 300° F. Sufficient pressure (500 p.s.i.g.) was applied to close the press to ½-inch stops in 1.67 minutes. Total press time was 9 minutes. The resultant boards at 51.9 pound per ft.³ density had MOR (modulus of rupture) values of 2950 p.s.i. and IB (internal bond) values of 225 p.s.i., as determined by ASTM D1037–60.

| Example | Binder | Melamine content, percent a | Urea: melamine mol ratio | Catalyst content, percent b | | Pot life hours | Strength properties | | |
|---|---|---|---|---|---|---|---|---|---|
| | | | | $NH_3$ | $(NH_4)_2SO_4$ | | MOR, p.s.i. | IB, p.s.i. | Impact, in.-lb. |
| Control | UF concentrate-urea | 0 | | 2.0 | 2.0 | 24 | 2,050 | 125 | 14–18 |
| 7 | Modified UF concentrate-urea | 2.3 | 53/1 | | 1.5 | 4 | 2,950 | 225 | 21–24 |
| 8 | do | 4.4 | 25.7/1 | 0.5 | 1.5 | 24 | 3,050 | 245 | 22–28 |
| 9 | do | 15.7 | 7.5/1 | | 2.5 | 24 | 2,850 | 230 | 23 | a Based on total weight of urea plus formaldehyde.
b Based on weight of UF Concentrate 85.

Examples 7–9

Example 6 was reated except that different amounts of urea and melamine were added to the UF Concentrate 85 to give various melamine contents while maintaining the formaldehyde:—$NH_2$ mol ratio at 0.8:1. A control containing no melamine was also tested. The above table gives the variable conditions, and results; from these examples it can be seen that the initial small amount of melamine sharply enhances the strength properties of the adhesive product.

Example 10

An adhesive slurry was prepared by mixing at room temperature, 2000 parts of UF Concentrate 85, a non-resinous urea-formaldehyde condensate, 936 parts of uncoated, pelleted urea, 116 parts of crude melamine (68.9% melamine, 12.7% ammelide, 10.5% ammeline and 7.9% other impurities), 370 parts of water, 18 parts of 28% aqua ammonia, and 30 parts of ammonium sulfate. The resulting slurry had an 0.8 to 1 formaldehyde to amine mol ratio. After standing one-half hour at 25° C., the slurry had a viscosity of 58 cps., a pH of 5.5 and contained 65% oven-dry resin solids.

To prepare a particle board, a mix containing 12 parts of Hercules Paracol 404N wax emulsion (45% wax solids) and 105 parts of water was sprayed onto 3830 parts of a pine-mixed hardwoods furnish at 6.1% moisture content. Then 444 parts of the above adhesive slurry, to give an 8% resin solids application, was sprayed in 2.5 minutes onto the furnish already containing 0.15% wax solids. The sprayed furnish had a moisture content of 11.1%. A mat containing 1300 parts of sprayed furnish was laid in a 15" x 12" forming box. The mat was transferred to an electrically heated platen press. Platen temperature was 300° F. Sufficient pressure (500 p.s.i.g.) was applied to close the press to one-half inch stops in 1.5 minutes. Total press times of five and nine minutes were used. The resultant boards at 47.8 and 50.2 pounds per cubic foot density had MOR (modulus of rupture) values of about 2600 p.s.i., MOE (modulus of elasticity) values of 500 p.s.i., internal bonds of 200 p.s.i. using ASTM D1037-60. On 24 hour soak tests, the boards showed 18.2% water absorption, 8.5% thickness swell and 0.3% linear expansion.

Prior art uses of mixtures of urea-formaldehyde condensates and urea, outside the mol ranges of the present invention, are known for impregnating wood for the sole purpose of dimensionally stabilizing the latter. In such uses of the mixtures as dimensional stabilizers for wood, where bonding is also required of the wood veneers or particles that are to be dimensionally stabilized, a separate adhesive material is necessary. Only the usual resinous urea-formaldehyde adhesives have been used for such purpose. However, use of the specific mixtures of non-resinous urea-formaldehyde condensate and melamine (and urea in certain cases) referred to herein, are not known nor remotely suggested in the prior art as adhesives that cure in situ, as far as we are aware. On the contrary, it has always been accepted in this art that urea-formaldehyde and/or melamine-formaldehyde and/or urea-, melamine-, formaldehyde condensates that are to be used as adhesives must be resinified prior to use. It was, of course, further unexpected, that slurries of certain non-resinous urea-formaldehyde condensates and unreacted and undissolved melamine (with or without additional urea) would be highly suitable as adhesive binders without the usual cooking to the resinous stage, and moreover, have desirably extended pot-life after addition of conventional hardening catalysts, but cure directly in situ under heat and/or pressure after application in non-resinous form to the surfaces of the materials to be bonded to result in excellent, water-resistant bonds.

I claim:

1. A stable slurry comprising a substantially unreacted mixture of (1) a pre-formed aqueous non-resinous urea-formaldehyde reaction product reacted to the polymethylolurea stage having 60% to 90% total solids, a mol ratio of 4.0 to 7.3 mols of formaldehyde per mol of urea and a pH of at least 7.0 and (2) an amount of a substance of the group consisting of melamine and mixtures of melamine and urea whereby the ratio of total mol of formaldehyde in the composition to —$NH_2$ groups furnished by the total amount of urea and melamine present in the composition is in the range of from 0.7 to 1.0 and the amount of melamine present is at least 0.5% by weight of total urea plus formaldehyde present.

2. The stable slurry of claim 1 wherein the pH of the non-resinous urea-formaldehyde reaction product is in the range of 7.0 to about 9.

3. A stable slurry as claimed in claim 2 that also comprises an extender and a hardening catalyst.

References Cited

UNITED STATES PATENTS

| | | | |
|---|---|---|---|
| 2,376,200 | 5/1945 | Smidth | 260—29 |
| 2,485,080 | 10/1949 | Wohnsiedler et al. | 260—67.6 |
| 2,625,524 | 1/1953 | Kvalnes | 260—17.3 |
| 2,652,377 | 9/1953 | Kise | 260—69 |
| 2,772,197 | 11/1956 | Kozdemba | 156—331 |
| 2,797,206 | 6/1957 | Suen et al. | 260—29.4 |
| 2,836,574 | 5/1958 | Brown | 156—331 |
| 2,898,324 | 5/1959 | Mackay | 260—70 |

ROBERT F. BURNETT, Primary Examiner

R. J. ROCHE, Assistant Examiner

U.S. Cl. X.R.

260—67.6 R; 156—331; 161—261